United States Patent
Katsu et al.

(10) Patent No.: US 11,745,728 B2
(45) Date of Patent: Sep. 5, 2023

(54) PARKING ASSISTANCE DEVICE AND PARKING ASSISTANCE METHOD

(71) Applicant: Mitsubishi Electric Corporation, Tokyo (JP)

(72) Inventors: Kenta Katsu, Tokyo (JP); Takashi Matsumoto, Tokyo (JP); Takahisa Aoyagi, Tokyo (JP); Masataka Shirozono, Tokyo (JP); Hiroshi Yamada, Tokyo (JP); Yukiyasu Akemi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 185 days.

(21) Appl. No.: 17/433,300

(22) PCT Filed: Apr. 23, 2019

(86) PCT No.: PCT/JP2019/017246
§ 371 (c)(1),
(2) Date: Aug. 24, 2021

(87) PCT Pub. No.: WO2020/217315
PCT Pub. Date: Oct. 29, 2020

(65) Prior Publication Data
US 2022/0135022 A1    May 5, 2022

(51) Int. Cl.
*B60W 30/06* (2006.01)
*B60W 40/06* (2012.01)

(52) U.S. Cl.
CPC ............ *B60W 30/06* (2013.01); *B60W 40/06* (2013.01); *B60W 2420/42* (2013.01);
(Continued)

(58) Field of Classification Search
CPC .. B60W 30/06; B60W 40/06; B60W 2420/42; B60W 2420/54; B60W 2520/06;
(Continued)

(56) References Cited

U.S. PATENT DOCUMENTS

2010/0259420 A1* 10/2010 Von Reyher ........... G08G 1/165
                                                                  701/1
2010/0274474 A1* 10/2010 Takano ............... B62D 15/0275
                                                                  340/932.2
(Continued)

FOREIGN PATENT DOCUMENTS

JP    2008-201177 A    9/2008
JP    2010-018074 A    1/2010
(Continued)

OTHER PUBLICATIONS

International Search Report of PCT/JP2019/017246 dated Jul. 16, 2019 [PCT/ISA/210].
(Continued)

*Primary Examiner* — Kenneth J Malkowski
(74) *Attorney, Agent, or Firm* — Sughrue Mion, PLLC; Richard C. Turner

(57) ABSTRACT

In a parking assistance device, a target parking position calculation unit calculates a target parking position of a subject vehicle based on a position of a corner point of a parking space. A constraint condition setting unit sets a constraint condition regarding a target parking route for guiding the subject vehicle to the target parking position based on a position and a posture angle of the subject vehicle, peripheral information of the subject vehicle, and the position of the corner point of the parking space. The constraint condition includes a condition that a curvature change rate of the target parking route is continuous. A target parking route calculation unit calculates the target parking route based on the position and the posture angle of the (Continued)

US 11,745,728 B2
Page 2 subject vehicle, the position of the corner point of the parking space, the target parking position, and the constraint condition.

17 Claims, 16 Drawing Sheets

(52) U.S. Cl.
CPC ..... *B60W 2420/54* (2013.01); *B60W 2520/06* (2013.01); *B60W 2554/4041* (2020.02)

(58) Field of Classification Search
CPC ..... B60W 2554/4041; B60W 2540/18; B60W 40/105; B62D 15/0285; G06V 20/586; G08G 1/146; G08G 1/147; G05D 1/0212
See application file for complete search history.

(56) References Cited

U.S. PATENT DOCUMENTS

| | | | |
|---|---|---|---|
| 2012/0062396 A1* | 3/2012 | Inoue | B62D 15/027 340/932.2 |
| 2015/0138011 A1* | 5/2015 | Hiramaki | G01S 17/931 367/99 |
| 2016/0063861 A1* | 3/2016 | Lee | G08G 1/14 340/932.2 |
| 2019/0196487 A1 | 6/2019 | Akiyama et al. | |
| 2019/0291722 A1* | 9/2019 | Maeda | B60W 10/20 |
| 2020/0047745 A1 | 2/2020 | Suzuki et al. | |

FOREIGN PATENT DOCUMENTS

| | | |
|---|---|---|
| JP | 2014-034230 A | 2/2014 |
| JP | 2017-052471 A | 3/2017 |
| WO | 2018/055916 A1 | 3/2018 |
| WO | 2018/066068 A1 | 4/2018 |

OTHER PUBLICATIONS

Office Action dated Feb. 8, 2022 in Japanese Application No. 2021-515355.

* cited by examiner

US 11,745,728 B2

PARKING ASSISTANCE DEVICE AND PARKING ASSISTANCE METHOD

CROSS REFERENCE TO RELATED APPLICATIONS

This application is a National Stage of International Application No. PCT/JP2019/017246 filed on Apr. 23, 2019.

TECHNICAL FIELD

The present invention relates to a parking assistance device and a parking assistance method.

BACKGROUND ART

With the development of autonomous driving technology of vehicles, various parking assistance devices for assisting vehicles in parking have been proposed. For example, Patent Document 1 below proposes a parking assistance device that calculates a route (parking route) from the current position of a vehicle to a target position for parking.

The parking assistance device of Patent Document 1 first detects the initial position (current position of the vehicle) of parking and the initial posture (orientation of the vehicle at the initial position), and the target position and parking posture of parking (orientation of the vehicle at the target position). Next, in accordance with the initial posture, the parking assistance device determines a route that can be set as a vehicle route from the initial position as the first movement route, and, in accordance with the parking posture, the parking assistance device determines a route that can be set as a vehicle route that reaches the target position as the second movement route. Subsequently, the parking assistance device calculates a candidate region in which a position serving as a contact point between the first movement route and the second movement route may exist. And, the parking assistance device determines the position selected by an occupant of the vehicle in the candidate region or the position arbitrarily automatically selected in the candidate region as a turning position, and calculates a series of routes from the initial position to reach the target position via the turning position as a parking route.

Further, in the parking assistance device of Patent Document 1, the first movement route and the second movement route are determined a route with a straight line added before or after a curve (a curve obtained by a cubic polynomial) that has only one inflection point, such as a clothoid curve.

PRIOR ART DOCUMENTS

Patent Documents

[Patent Document 1] Japanese Patent Application Laid-Open No. 2010-18074

SUMMARY

Problem to be Solved by the Invention

In the parking assistance device of Patent Document 1, the parking route is generated by combining the straight line and the clothoid curve; therefore, the curvature change rate of the parking route may be discontinuous at the connection point between each line. The steering speed is discontinuous at the point where the curvature change rate of the parking route is discontinuous; therefore, the change of the steering wheel behavior is required to be large, leading to a difficulty in smooth parking of the vehicle in the parking position.

The present invention has been made to solve the problems as described above, and an object is to provide a parking assistance device that calculates a parking route that enables a vehicle to park at a parking position without having a large change in the steering wheel behavior.

Means to Solve the Problem

According to the present invention, the parking assistance device includes a vehicle position information calculation unit configured to calculate a position and a posture angle of a vehicle, a peripheral information acquisition unit configured to acquire peripheral information of the vehicle, a parking space detection unit configured to detect a parking space based on the peripheral information of the vehicle, a target parking position calculation unit configured to calculate a target parking position of the vehicle based on a position of a corner point of the parking space, a constraint condition setting unit configured to set a constraint condition regarding a target parking route for guiding the vehicle to the target parking position based on a position and a posture angle of the vehicle, the peripheral information, and the position of the corner point of the parking space, a target parking route calculation unit configured to calculate the target parking route based on the position and the posture angle of the vehicle, the position of the corner point of the parking space, the target parking position, and the constraint condition, and a vehicle control unit configured to park the vehicle at the target parking position by making the vehicle travel following the target parking route, in which the constraint condition setting unit sets a condition that a curvature change rate of the target parking route is continuous as the constraint condition.

Effects of the Invention

According to the parking assistance device of the present invention, a parking route that enables a vehicle to park at a parking position without having a large change in the steering wheel behavior is calculated.

The objects, features, aspects, and advantages of the present invention will become more apparent from the following detailed description and the accompanying drawings.

DESCRIPTION OF EMBODIMENT(S)

Figure 1:
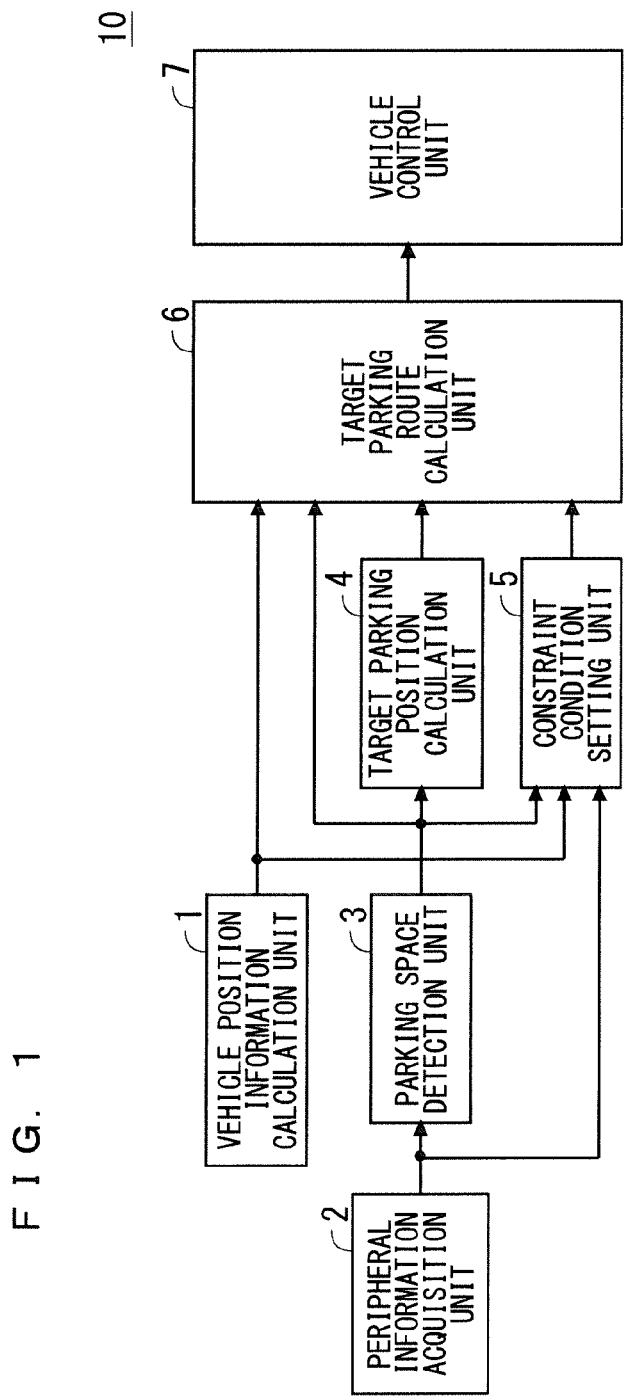
FIG. 1 A block diagram illustrating a configuration of a parking assistance device according to Embodiment of the present invention.

FIG. 1 is a block diagram illustrating a configuration of a parking assistance device 10 according to Embodiment of the present invention. As illustrated in FIG. 1, the parking assistance device 10 includes a vehicle position information calculation unit 1, a peripheral information acquisition unit 2, a parking space detection unit 3, a target parking position calculation unit 4, a constraint condition setting unit 5, a target parking route calculation unit 6, and a vehicle control unit 7. Here, it is assumed that the parking assistance device 10 is mounted on a vehicle, and hereinafter, the vehicle equipped with the parking assistance device 10 is referred to as "subject vehicle".

The vehicle position information calculation unit 1 calculates the position and the posture angle (orientation) of the subject vehicle based on the output of the sensor provided in the subject vehicle. In Embodiment, a wheel speed sensor and a yaw rate sensor are used as the above sensors, and the vehicle position information calculation unit 1 calculates a relative position of the subject vehicle with respect to a predetermined reference position as the position of the subject vehicle, and calculates the relative orientation of the subject vehicle with respect to the predetermined reference orientation as the posture angle of the subject vehicle. That is, the vehicle position information calculation unit 1 calculates the movement amount and the movement direction of the position of the subject vehicle from the reference position based on the hourly moving distance of the subject vehicle calculated from the wheel speed measured by the wheel speed sensor and the hourly change in posture angle of the subject vehicle calculated from the yaw rate of the subject vehicle measured by the yaw rate sensor. Further, the vehicle position information calculation unit 1 obtains the orientation of the subject vehicle with respect to a predetermined reference orientation based on the hourly change in the posture angle of the subject vehicle calculated from the yaw rate of the subject vehicle.

In Embodiment, the position of the subject vehicle when the parking assistance device 10 starts the parking assistance operation is set as the reference position, and the orientation of the subject vehicle at the reference position (front direction of the subject vehicle) is set as the reference orientation. The position (coordinates) of the subject vehicle is represented by a coordinate system with the reference position of the subject vehicle as the origin. Further, in Embodiment, the position of the subject vehicle is defined as the central position of the wheel shaft of the rear wheels of the subject vehicle. However, the reference position and the reference orientation may arbitrarily be set, and the position of the subject vehicle may arbitrarily be defined.

The peripheral information acquisition unit 2 acquires peripheral information on the situation around the subject vehicle. In Embodiment, based on information on distance and direction from the subject vehicle to an obstacle (including other vehicles) measured by an ultrasonic sensor provided in the subject vehicle, the peripheral information acquisition unit 2 acquires information on the position of the obstacle as the peripheral information.

The peripheral information acquisition unit 2 may acquire peripheral information from an image of the scenery around the subject vehicle imaged by a camera. For example, the peripheral information acquisition unit 2 may detect a parking frame drawn on the road surface from an image imaged by the camera and acquire information on the position of the parking frame as the peripheral information. Needless to say, the peripheral information acquisition unit 2 may acquire the peripheral information using both the ultrasonic sensor and the camera.

The parking space detection unit 3 detects a parking space available for the subject vehicle to park (hereinafter, simply referred to as "parking space") based on the peripheral information acquired by the peripheral information acquisition unit 2. In Embodiment, the peripheral information acquisition unit 2 acquires the position of a corner point of another vehicle (hereinafter referred to as "pre-existing parked vehicle") already parked around the subject vehicle as the peripheral information, and the parking space detection unit 3 detects the parking space from the position of the corner point of the pre-existing parked vehicle.

Figure 2:
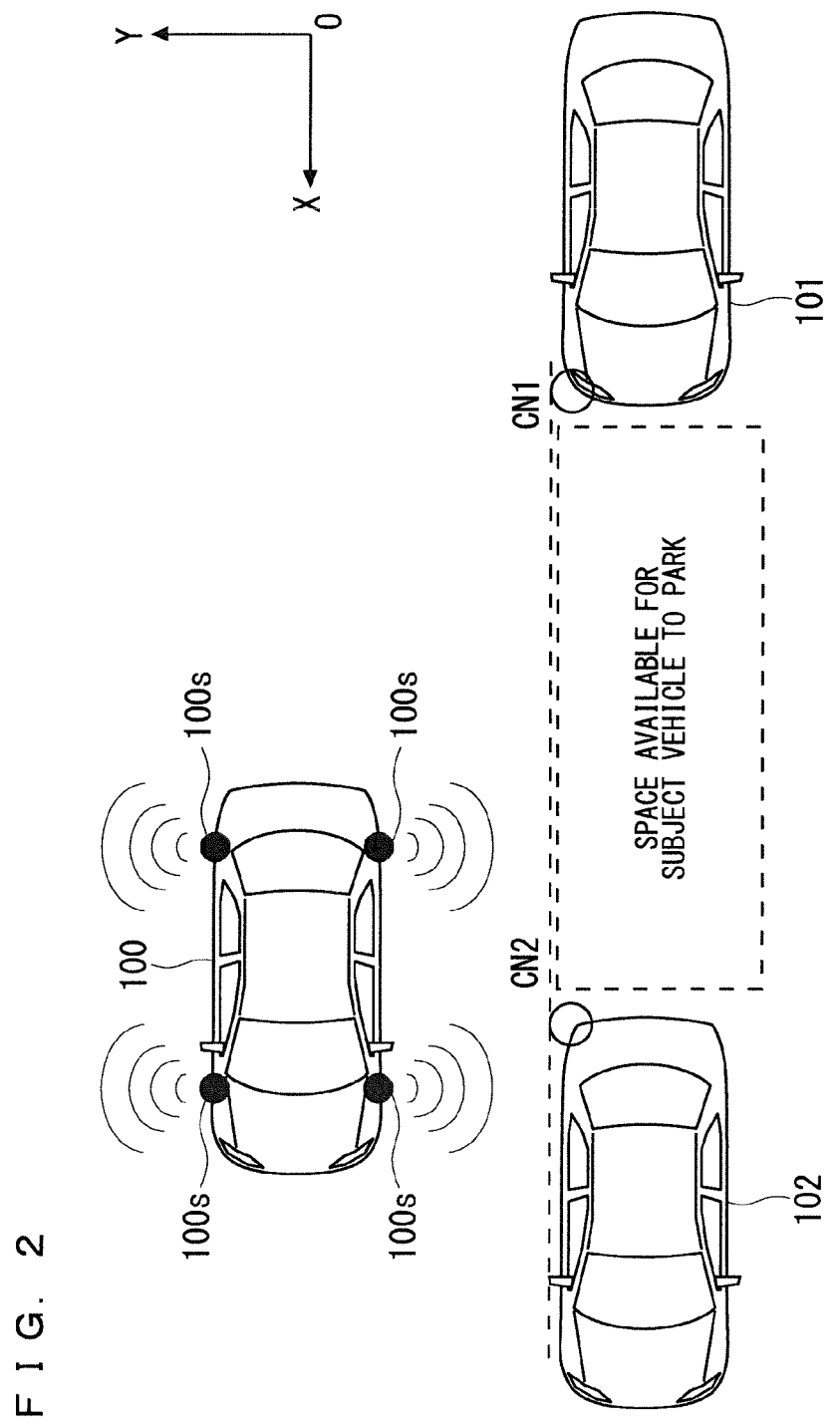
FIG. 2 A diagram for explaining the operation of a parking space detection unit.

For example, as illustrated in FIG. 2, the peripheral information acquisition unit 2 uses an ultrasonic sensor 100s of the subject vehicle 100 to measure the respective distances to the pre-existing parked vehicles 101, 102 when the subject vehicle 100 passes by the pre-existing parked vehicles 101, 102, determines the positions and shapes of the pre-existing parked vehicles 101, 102 from the information of the distances, and detects the corner points of the pre-existing parked vehicles 101, 102. At this point, when a space between the front end corner point CN1 of the pre-existing parked vehicle 101 and the rear end corner point CN2 of the pre-existing parked vehicle 102 in front of the pre-existing parked vehicle 101 is longer or wider than the length or width of the subject vehicle 100, the parking space detection unit 3 detects the space between the corner points CN1 and CN2 as a parking space. Therefore, the corner point CN1 of the pre-existing parked vehicle 101 and the corner point CN2 of the pre-existing parked vehicle 102 can be referred to as the corner points of the parking space. Therefore, the parking space detection unit 3 also treats the positions of the corner points CN1 and CN2 as information indicating the position of the parking space.

In Embodiment, the positions (coordinates) of the corner points CN1, CN2 are also represented in the coordinate system with the reference position of the subject vehicle 100 (the position of the subject vehicle when the parking assistance device 10 starts the parking assistance operation) as the origin. Here, as illustrated in FIG. 2, the X-axis direction represents the front direction of the subject vehicle 100 at the reference position, and the Y-axis direction represents the vehicle width direction of the subject vehicle 100 at the reference position.

When the peripheral information acquisition unit 2 acquires peripheral information from an image imaged by the camera, the parking space can be detected from the image. For example, when the peripheral information acquisition unit 2 detects a parking frame drawn on the road surface from the image around the subject vehicle and detects a parking frame longer or wider than the length or width of the subject vehicle, the parking space detection unit 3 need only detect the parking frame as a parking space, and recognize the four corners of the parking frame as corner points of the parking space.

The target parking position calculation unit 4 calculates the target parking position, which is the target position when the subject vehicle is to be parked in the parking space, based on the information on the corner point positions of the parking space detected by the parking space detection unit 3. In Embodiment, the position of the subject vehicle is defined as the center position of the wheel shaft of the rear wheels; therefore, the target parking position calculation unit 4 determines a point positioned in the center of the wheel shaft of the rear wheels of the subject vehicle when the subject vehicle is parked in the parking space, as the target parking position.

Figure 3:
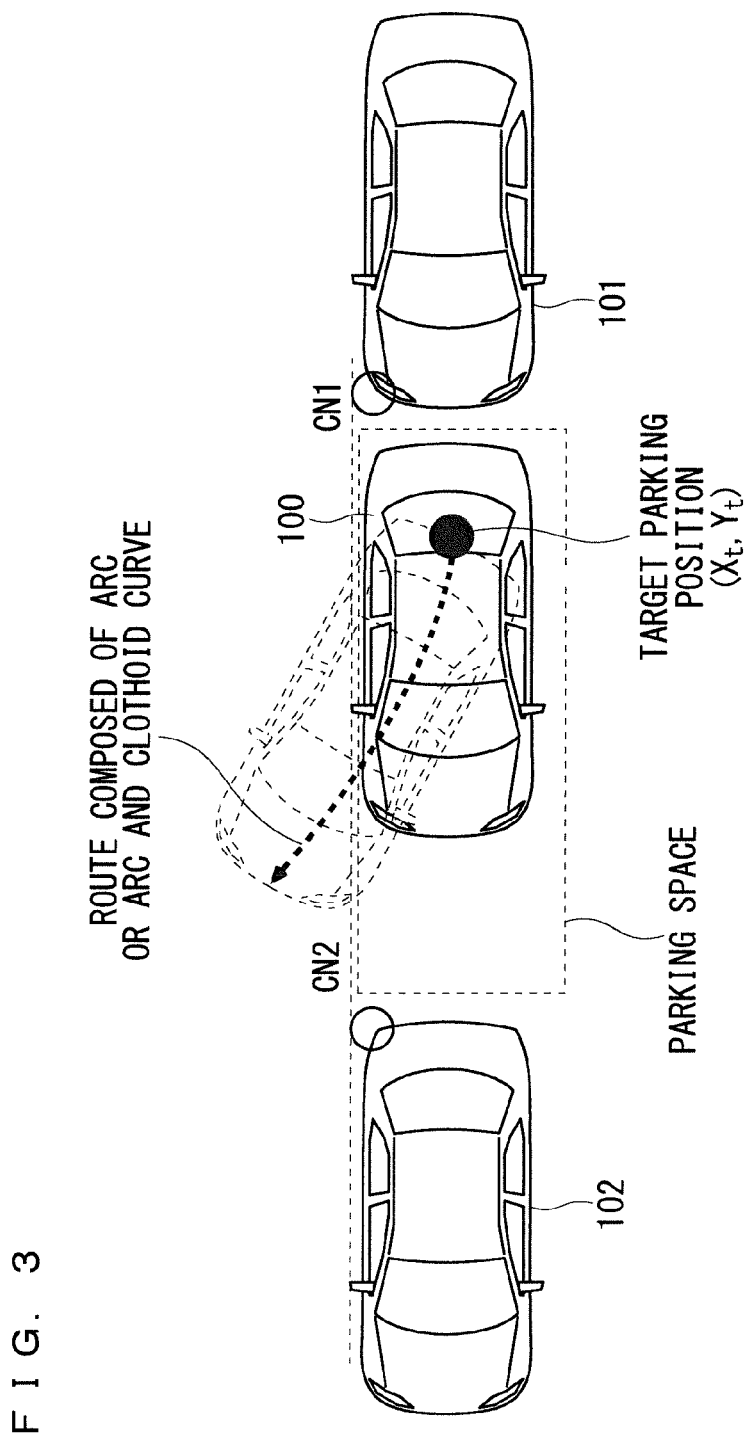
FIG. 3 A diagram for explaining the operation of a target parking position calculation unit.

When parallel parking the subject vehicle 100 in the parking space between the pre-existing parked vehicles 101 and 102 lined up in front and behind, for example, as illustrated in FIG. 3, the target parking position calculation unit 4 calculates a parking position from which the vehicle 100 can leave from the parking space on a route having an arc-shape or a route having a curved shape composed of an arc and clothoid curve without touching the corner point CN1 at the front end of the pre-existing parked vehicle 101 located behind the parking space and the corner point CN2 at the rear end of the pre-existing parked vehicle 102 located in front of the parking space, and determines the parking position as the target parking position $(X_t, Y_t)$.

Figure 4:
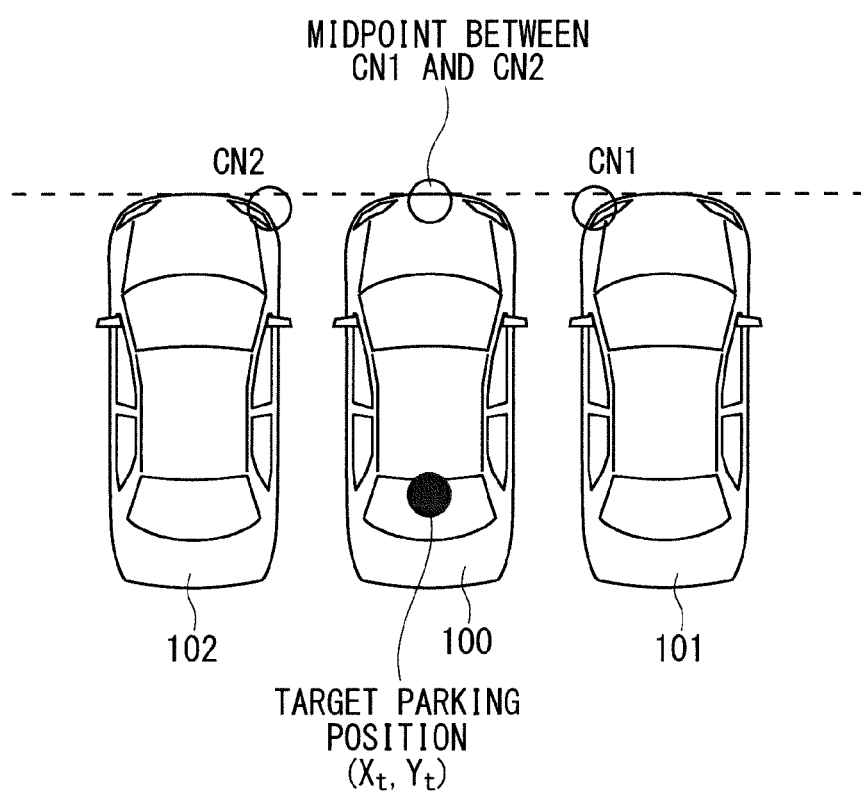
FIG. 4 A diagram for explaining the operation of the target parking position calculation unit.

Also, as illustrated in FIG. 4, when parallel parking the subject vehicle 100 in the parking space between the pre-existing parked vehicles 101 and 102 that are lined up side by side, the target parking position calculation unit 4 calculates a parking position such that the front end of the subject vehicle 100 is to locate at the midpoint between the front corner point CN1 of the pre-existing parked vehicle 101 located on the right side of the parking space and the front corner point CN2 of the pre-existing parked vehicle 102 located on the left side of the parking space, and determines the parking position as the target parking position $(X_t, Y_t)$.

The constraint condition setting unit 5 sets a constraint condition regarding a target parking route being a route for guiding the subject vehicle to the target parking position, based on the position and the posture angle of the subject vehicle, the peripheral information, and positions of corner points of the parking space. As a constraint condition, for example, the upper limit value of the steering angle of the subject vehicle (that is, the upper limit value of the curvature of the target parking route), the upper limit value of the steering speed of the subject vehicle (that is, the upper limit value of the curvature change rate of the target parking route), and the like are included.

Figure 5:
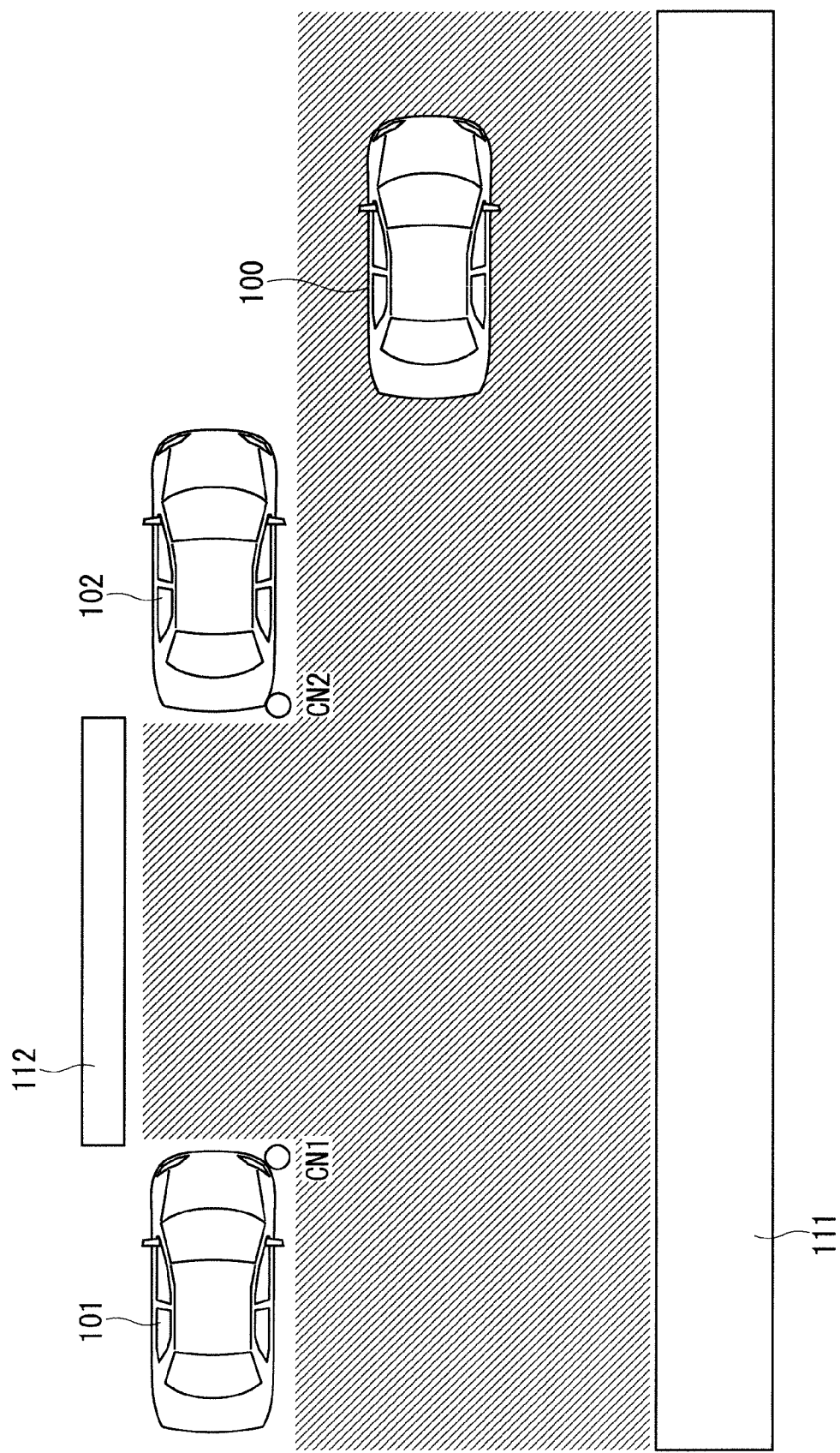
FIG. 5 A diagram illustrating an example of a movable range of a subject vehicle.

The constraint condition setting unit 5 may set a movable range of the subject vehicle as a constraint condition based on the peripheral information. For example, it is preferable that, as illustrated in FIG. 5, when there are obstacles such as a wall 111 and a curb 112 in addition to the pre-existing parked vehicles 101 and 102, the constraint condition setting unit 5 determines the range in which the subject vehicle 100 does not come into contact with those obstacles (the shaded area) as a movable range of the subject vehicle 100, and sets that the target parking route falling within the range as a constraint condition of the target parking route.

The target parking route calculation unit 6 calculates a route that satisfies the constraint condition, with which the subject vehicle can park at the target parking position without colliding with pre-existing parked vehicles, based on the position and the posture angle of the subject vehicle, positions of corner points of the parking space (corner points of the pre-existing parked vehicles), the target parking position, and the constraint condition, and sets the calculated route as the target parking route.

Figure 6:
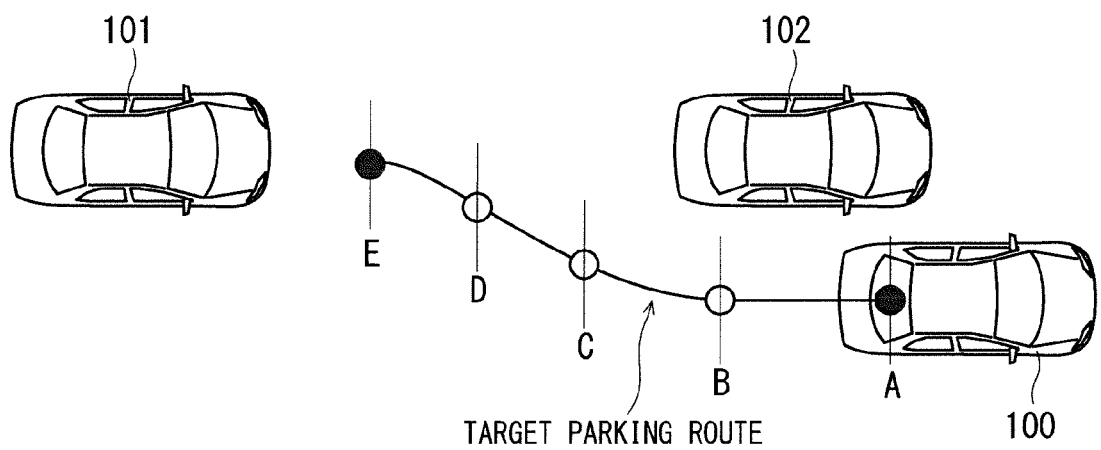
FIG. 6 A diagram illustrating an example of a target parking route.
Figure 7:
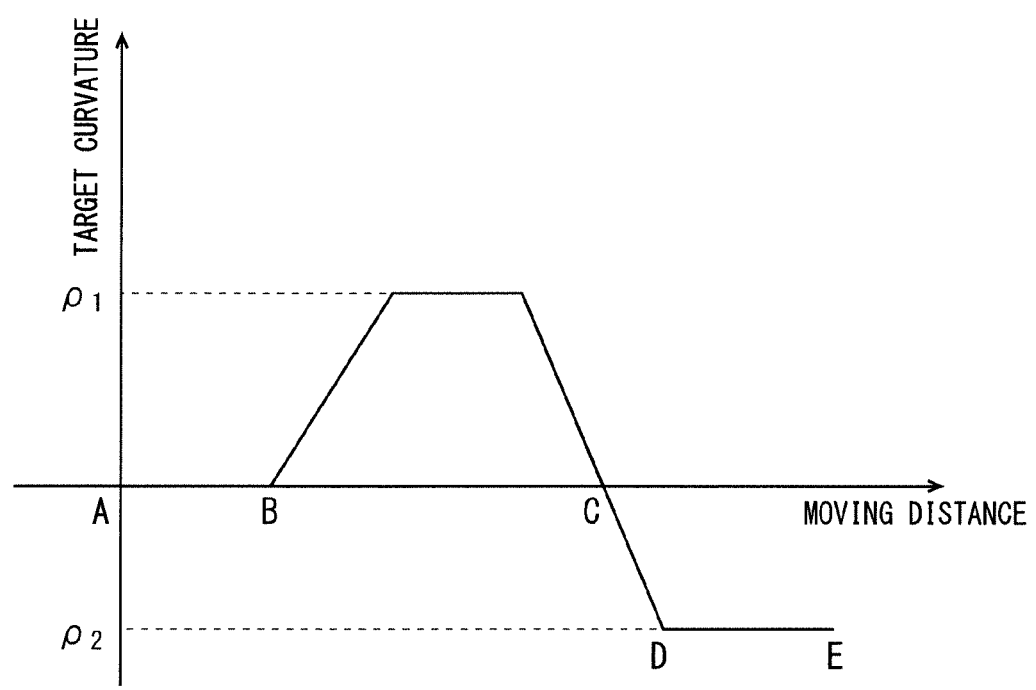
FIG. 7 A graph illustrating an example of a map of target curvature.

In Embodiment, the target parking route calculation unit 6 outputs the calculated target parking route as a map representing the curvature at each point on the target parking route (hereinafter referred to as "target curvature"). For example, when the target parking route of the subject vehicle 100 is calculated as illustrated in FIG. 6, the target parking route calculation unit 6 outputs a map showing the relationship between the moving distance and the target curvature on the target parking route as illustrated in FIG. 7. Points A to E illustrated in FIG. 7 correspond to points A to E illustrated in FIG. 6, respectively. It should be noted that FIG. 7 is for explaining the outline of the map of a target curve, and is not the map actually output by the target parking route calculation unit 6 (the actual map is illustrated by the broken line in FIG. 15).

The vehicle control unit 7 performs steering control and drive control of the subject vehicle in accordance with the map of the target curvature output by the target parking route calculation unit 6. As a result, the subject vehicle autonomously travels so as to follow the target parking route and autonomously parks at the target parking position.

Here, when the parking assistance device 10 sets the target parking route as a route combining a straight line and a clothoid curve, the curvature change rate of the target parking route (that is, the rate of change in target curvature) at the connection point between each line may possibly be discontinuous. At the point where the curvature change rate of the target parking route is discontinuous, the steering wheel of the subject vehicle is required a large change in its behavior.

Figure 8:
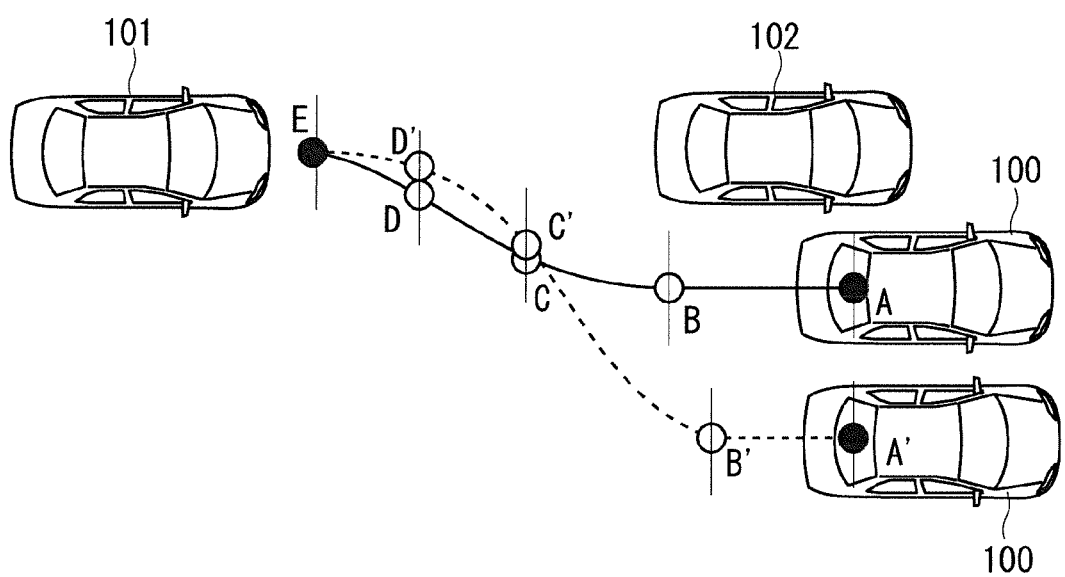
FIG. 8 A diagram illustrating an example of a target parking route.
Figure 9:
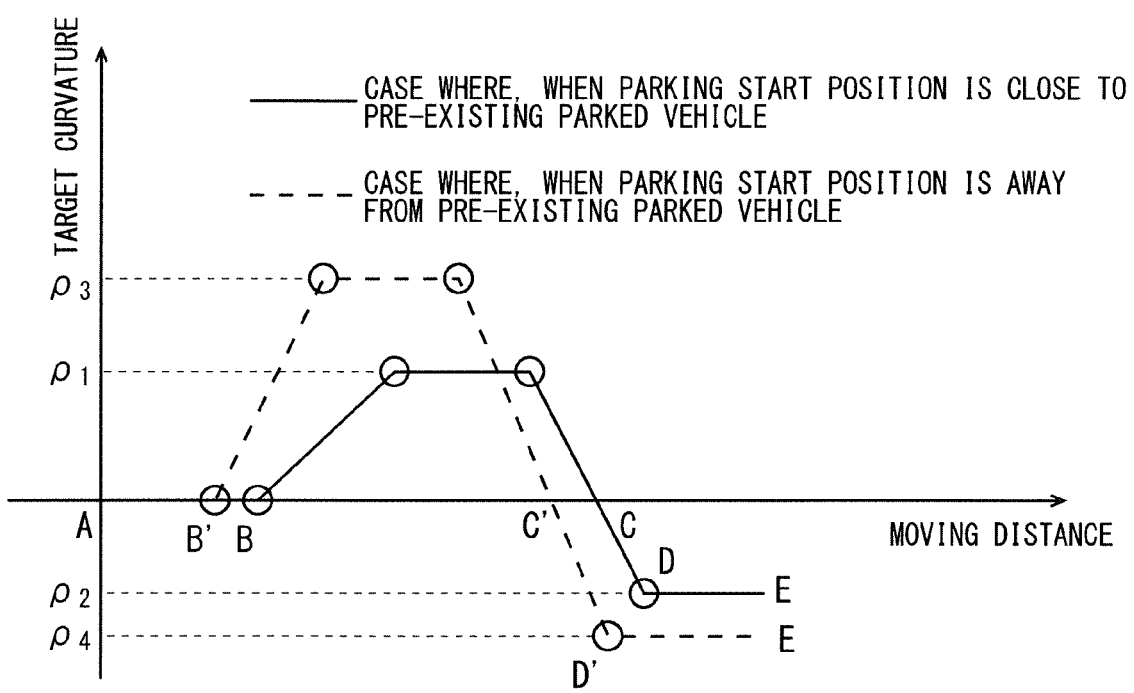
FIG. 9 A graph illustrating an example of a map of target curvature.

For example, as illustrated in FIG. 8, when parallel parking the subject vehicle 100 at the target parking position (point E) between the pre-existing parked vehicles 101 and 102 lined up in front and behind, the shape of the target parking routes changes significantly between a case where, when the parking start position of the subject vehicle 100 is close to the pre-existing parked vehicle 102 (point A) and a case where, when the parking start position of the subject vehicle 100 is away from the pre-existing parked vehicle 102 (point A'). That is, in comparison, there is a change in that the target parking route (dotted line) when starting from a point away from the pre-existing parked vehicle 101 (point A') is greater in target curvature than the target parking route (solid line) when starting from a point close to the pre-existing parked vehicle 101 (point A). FIG. 9 illustrates a map of the target curvatures corresponding to both. When a large change occurs in the target curvature, the steering speed is required to increase, and this causes an abrupt change in the steering wheel behavior, giving the driver a sense of unease.

Therefore, in Embodiment, the constraint condition setting unit 5 sets a condition that the curvature change rate of the target parking route is continuous as a constraint condition. Further, the target parking route calculation unit 6 expresses the target parking route using a polynomial having a degree of 4 or more (hereinafter referred to as "fourth or higher degree polynomial").

Figure 10:
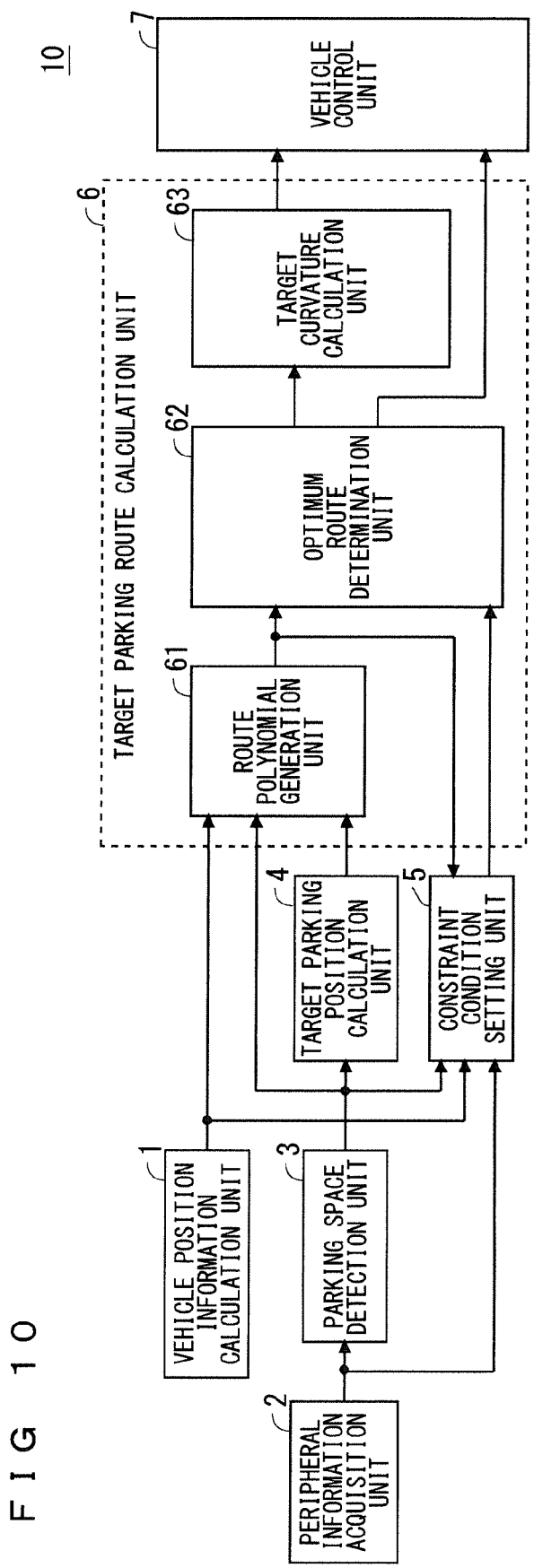
FIG. 10 A block diagram illustrating a configuration of a target parking route calculation unit.

FIG. 10 illustrates the details of the target parking route calculation unit 6. As illustrated in FIG. 10, the target parking route calculation unit 6 includes a route polynomial generation unit 61, an optimum route determination unit 62, and a target curvature calculation unit 63.

The route polynomial generation unit 61 divides the route from the position of the subject vehicle to the target parking position into a plurality of sections based on the position and the posture angle of the subject vehicle, the target parking position, and the position of the corner points of the parking space, and expresses each of a plurality of sections as a fourth or higher degree polynomial. The optimum route determination unit 62 determines the polynomial of each section of the target parking route by finding a solution in which the polynomials representing the plurality of sections satisfy the constraint condition. Based on the polynomial of each section of the target parking route, the target curvature calculation unit 63 calculates the curvature (target curvature) of each point on the target parking route and creates a map of the target curvature, and outputs the map to the vehicle control unit 7.

Figure 11:
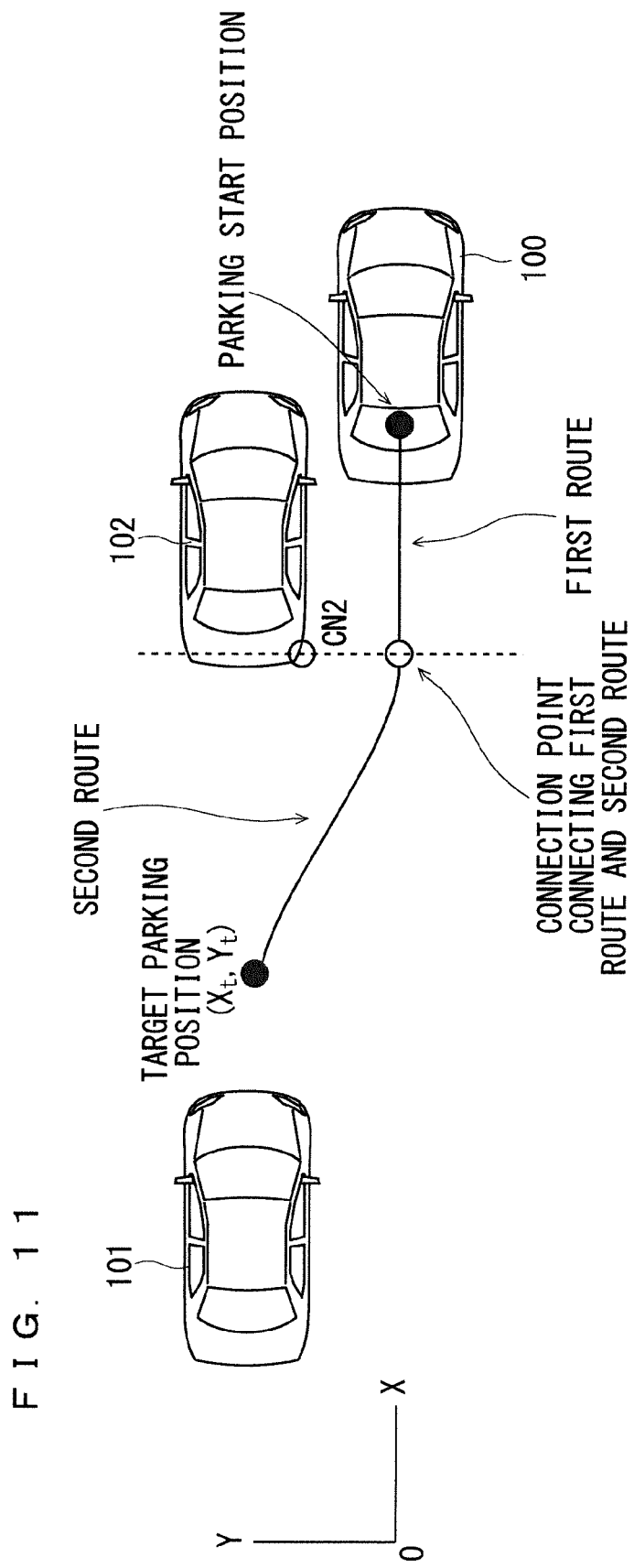
FIG. 11 A diagram illustrating an example of a target parking route represented by a polynomial generated by a route polynomial generation unit.

Hereinafter, a route generation method using the fourth or higher degree polynomial will be described by taking parallel parking as an example. For example, as illustrated in FIG. 11, consider a case where the subject vehicle 100 is to be parallel parked between the pre-existing parked vehicles 101 and 102 lined up in front and behind. In this case, with a point whose X coordinate is the same as the corner point CN2 at the rear end of the pre-existing parked vehicle 102 located in front of the parking space being a connection point, the route polynomial generation unit 61 divides a route from the position of the subject vehicle 100 to the target parking position $(X_t, Y_t)$ into a first route being a section from the parking start position (initial position) of the subject vehicle 100 to the connection point and a second route being a section from the connection point to the target parking position $(X_t, Y_t)$, and expresses each of the first route and the second route with the fourth or higher degree polynomial. For example, when a sixth degree polynomial is used, the first route and the second route are represented as Expression (1) and Expression (2), respectively.

[Expression 1]

$$y_1(x) = p_0(x-X_0)^6 + p_1(x-X_0)^5 + p_2(x-X_0)^4 + p_3(x-X_0)^3 + p_4(x-X_0)^2 + p_5(x-X_0) + p_6 \quad (1)$$

[Expression 2]

$$y_2(x) = q_0(x-x_t)^6 + q_1(x-x_t)^5 + q_2(x-x_t)^4 + q_3(x-x_t)^3 + q_4(x-x_t)^2 + q_5(x-x_t) + q_6 \quad (2)$$

In Expressions (1) and (2), $y_1(x)$ represents the Y coordinate of the first route, $y_2(x)$ represents the Y coordinate of the second route, $p_0$ to $p_6$ represent the polynomial coefficients in the first route, $q_0$ to $q_6$ represent the polynomial coefficients in the second route, x represents the X coordinate of the subject vehicle position, $x_0$ represents the X coordinate of the connection point (corner point CN2), and $x_t$ represents the X coordinate of the target parking position. Here, although an example with a sixth degree polynomial is illustrated, the degree of the polynomial need only be 4 or more. Further, the connection point may also be any position between the parking start position of the subject vehicle 100 and the corner point CN2.

The constraint condition setting unit 5 sets the constraint condition such that the curvature change rate of the first route represented by Expression (1) and the curvature change rate of the second route represented by Expression (2) are continuous at the connection point. In order for the curvature change rate of the first route and the curvature change rate of the second route to be continuous at the connection point, Expression (3) need only be satisfied in which $v_1$ represents the curvature change rate of the first route, $v_2$ represents the curvature change rate of the second route, and $(X_0, Y_0)$ represents the coordinates of the connection point (corner point CN2).

[Expression 3]

$$v_1(X_0) = v_2(X_0) \quad (3)$$

Here, when the subject vehicle 100 retreats on the route $y = y(x)$ at an angle of sideslip 0, the posture angle $\gamma$, the curvature $\rho$, and the curvature change rate $v$ of the target parking route of the subject vehicle 100 are expressed as in Expressions (4) to (6).

[Expression 4]

$$\gamma(x) = \arctan\left(\frac{dy}{dx}(x)\right) \quad (4)$$

[Expression 5]

$$\rho(x) = -\cos^3(\gamma(x))\frac{d^2y}{dx^2}(x) \quad (5)$$

[Expression 6]

$$v(x) = -3\tan(\gamma(x))\rho(x)^2 + \cos^4(\gamma(x))\frac{d^3y}{dx^3}(x) \quad (6)$$

In Expressions (4) to (6), x represents the X coordinate of the subject vehicle 100, and $dy/dx$, $d^2y/dx^2$, and $d^3y/dx^3$ represent the primary differential value, secondary differential value, and tertiary differential value of $y = y(x)$, respectively.

From Expression (6), the curvature change rate $v_1$ of the first route and the curvature change rate $v_2$ of the second route at the connection point $(X_0, Y_0)$ can be expressed as Expressions (7) and (8), respectively.

[Expression 7]

$$v_1(X_0) = -3\tan(\gamma(X_0))\rho(X_0)^2 + \cos^4(\gamma(X_0))\frac{d^3y_1}{dx^3}(X_0) \quad (7)$$

[Expression 8]

$$v_2(X_0) = -3\tan(\gamma(X_0))\rho(X_0)^2 + \cos^4(\gamma(X_0))\frac{d^3y_2}{dx^3}(X_0) \quad (8)$$

From Expressions (3), (7) and (8), the curvature change rate of the target parking route becomes continuous if the tertiary differential of the polynomial $y_1(x)$ of the first route is consistent with the tertiary differential of the polynomial $y_2(x)$ of the second route, at the connection point. The constraint condition setting unit 5 sets this condition as a constraint condition.

Further, in addition to the condition that the curvature change rate of the target parking route is continuous as a constraint condition, the constraint condition setting unit 5 sets a constraint condition such that the Y coordinate, the posture angle γ, the curvature ρ, etc. of the position of the subject vehicle 100 are also continuous at the connection point. From Expressions (3) and (4), the posture angle $\gamma_1$ of the subject vehicle 100 on the first route at the connection point, the posture angle $\gamma_2$ of the subject vehicle 100 on the second route at the connection point, the curvature $\rho_1$ of the first route at the connection point, and the curvature $\rho_2$ of the second route at the connection point can be expressed as following Expressions (9) to (12), respectively.

[Expression 9]

$$\gamma_1(x) = \arctan\left(\frac{dy_1}{dx}(X_0)\right) \quad (9)$$

[Expression 10]

$$\gamma_2(x) = \arctan\left(\frac{dy_2}{dx}(X_0)\right) \quad (10)$$

[Expression 11]

$$\rho_1(x) = -\cos^3(\gamma(X_0))\frac{d^2 y_1}{dx^2}(X_0) \quad (11)$$

[Expression 12]

$$\rho_2(x) = -\cos^3(\gamma(X_0))\frac{d^2 y_2}{dx^2}(X_0) \quad (12)$$

Therefore, in order for the Y coordinate, posture angle, and curvature of the position of the subject vehicle 100 to be continuous at the connection point, as shown in Expressions (13) to (15), the Y coordinate of the subject vehicle 100 on the first route need only be consistent with the Y coordinate of the subject vehicle 100 on the second route, the posture angle of the subject vehicle 100 on the first route need only be consistent with the posture angle of the subject vehicle 100 on the second route, and the curvature of the first route need only be consistent with the curvature of the second route, at the connection point.

[Expression 13]

$$y_1(X_0) = y_2(X_0) \quad (13)$$

[Expression 14]

$$\gamma_1(X_0) = \gamma_2(X_0) \quad (14)$$

[Expression 15]

$$\rho_1(X_0) = \rho_2(X_0) \quad (15)$$

From Expressions (9) to (15), the position, posture angle, and curvature of the subject vehicle 100 on the target parking route become continuous when the value of the polynomial $y_1(x)$ of the first route is consistent with the value of the polynomial $y_2(x)$ of the second route, the primary differential of the polynomial $y_1(x)$ of the first route is consistent with the primary differential of the polynomial $y_2(x)$ of the second route, and the secondary differential of the polynomial $y_1(x)$ of the first route is consistent with the secondary differential of the polynomial $y_2(x)$ of the second route, at the connection point, The constraint condition setting unit 5 also adds these conditions to the constraint conditions.

By setting the above constraints, the curvature change rate of the target parking route, the position of the subject vehicle 100 on the target parking route, the posture angle, and the curvature can be made continuous, and abrupt steering behavior near the connection point can be eliminated.

Based on the target parking route represented by the fourth or higher degree polynomial generated by the route polynomial generation unit 61 and the constraint conditions set by the constraint condition setting unit 5, the optimum route determination unit 62 finds a solution in which the fourth or higher degree polynomial satisfies the constraint conditions thereby determining a polynomial representing the target parking route.

In Embodiment, in the polynomial of the first route and the polynomial of the second route generated by the route polynomial generation unit 61, optimum values of polynomial coefficients of the polynomials of the first route and second route ($p_0$ to $p_6$ and $q_0$ to $q_6$ in Expressions (1) and (2)) are obtained by calculating a constrained optimization problem that minimizes the route length from the parking start position to the target parking position represented by Expression (16) under the constraint conditions generated by the constraint condition setting unit 5. Then, the polynomials of the first route and the second route to which the optimum polynomial coefficients are applied are determined as the definitive target parking route.

[Expression 16]

$$\min_{p,q} \int_{X_0}^{X_f} \sqrt{1 + \left(\frac{dy}{dx}(x)\right)^2}\, dx \quad (16)$$

In Expression (16), p and q represent polynomial coefficients, $x_0$ represents the X coordinate of the parking start position, and $x_f$ represents the X coordinate of the target parking position. Examples of a solution method of the optimization problem include dynamic programming and sequential quadratic programming method, however, any method may be used as long as the optimization problem can be solved.

The target parking route determined by the optimum route determination unit 62 is selected so as to satisfy all the constraint conditions set by the constraint condition setting unit 5; therefore, the target parking route falls within the movable range of the subject vehicle and is the route that does not exceed the upper limits of the steering angle and steering speed of the subject vehicle. Further, the optimum route determination unit 62 solves the optimization problem that minimizes the route length from the parking start position to the target parking position; therefore, the target parking route determined by the optimum route determination unit 62 is a route that allows reaching the target parking position by the shortest distance.

Meanwhile, when the optimum route determination unit 62 cannot find the target parking route satisfying the constraint conditions, that is, if there is no solution to the optimization problem that minimizes an evaluation function including the curvature change rate of the target parking route and the route length from the parking start position to the target parking position, the parking assistance device 10 cannot operate parking assistance for parking the subject vehicle at the target parking position. Therefore, in that case, the optimum route determination unit 62 outputs a signal for stopping the parking assistance to the vehicle control unit 7, and ends the operation of the parking assistance by the parking assistance device 10.

The target curvature calculation unit 63 calculates the curvature (target curvature) of each point on the target parking route based on the polynomial of the optimum target parking route determined by the optimum route determination unit 62, and creates a map of the target curvature. For example, in the example illustrated in FIG. 11, the target curvature calculation unit 63 calculates each of the target curvature of the first route from the parking start position to the connection point (corner point CN2) and the target curvature of the second route from the connection point to the target parking position with the use of above Expression (5).

Figure 12:
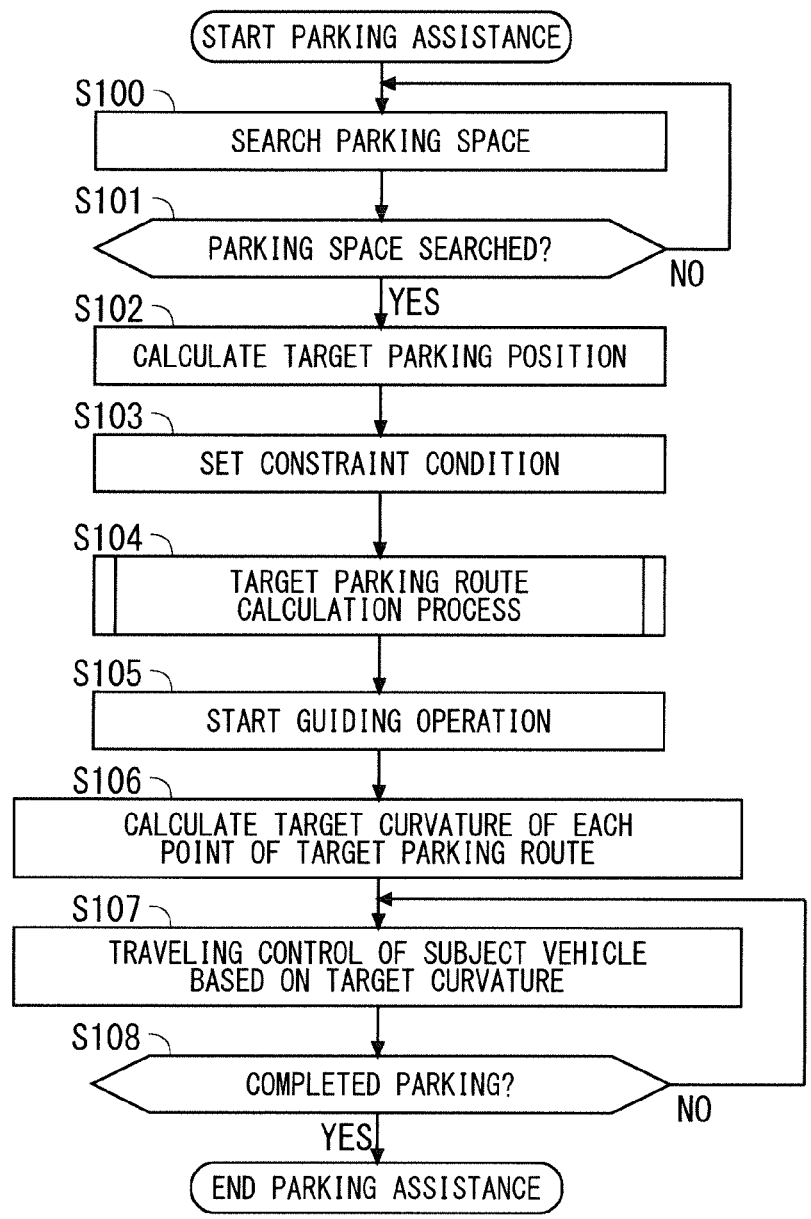
FIG. 12 A flowchart illustrating an outline of the operation of the parking assistance device according Embodiment of the present invention.

Next, the operation of the parking assistance device 10 according to Embodiment will be described with reference to the flowchart illustrated in FIG. 12.

When the parking assistance device 10 starts the parking assistance operation of the subject vehicle, the parking space detection unit 3 searches for a parking space around the subject vehicle based on the peripheral information acquired by the peripheral information acquisition unit 2 (Step S100). While no parking space is detected (NO in Step S101), step S100 is repeatedly executed.

When the parking space is detected (YES in Step S101), the target parking position calculation unit 4 calculates the target parking position which is for parking the subject vehicle in the parking space detected in Step S100 (Step S102). Then, the constraint condition setting unit 5 sets the constraint conditions regarding the target parking route for guiding the subject vehicle to the target parking position (Step S103). In Step S103, general constraint conditions such as an upper limit of the steering angle of the subject vehicle, an upper limit of the steering speed of the subject vehicle, and a movable range of the subject vehicle are set.

After that, the target parking route calculation unit 6 executes a process (target parking route calculation process) of calculating a route that satisfies the constraint conditions and can park the subject vehicle at the target parking position as the target parking route (Step S104). The details of the target parking route calculation process will be described later.

When the target parking route is determined, the target parking route calculation unit 6 starts a guidance operation for guiding the subject vehicle to the target parking position (Step S105), and calculates the target curvature at each point of the target parking route (Step S106). Thereby a map of the target curvature is created.

After that, the vehicle control unit 7 controls the traveling of the subject vehicle based on the map of the target curvature (Step S107). As a result, the subject vehicle travels so as to follow the target parking route. The vehicle control unit 7 continues the Step S107 until the parking of the subject vehicle at the target parking position is completed (NO in Step S108), and when the parking is completed (YES in Step S108), the parking assistance operation ends.

Figure 13:
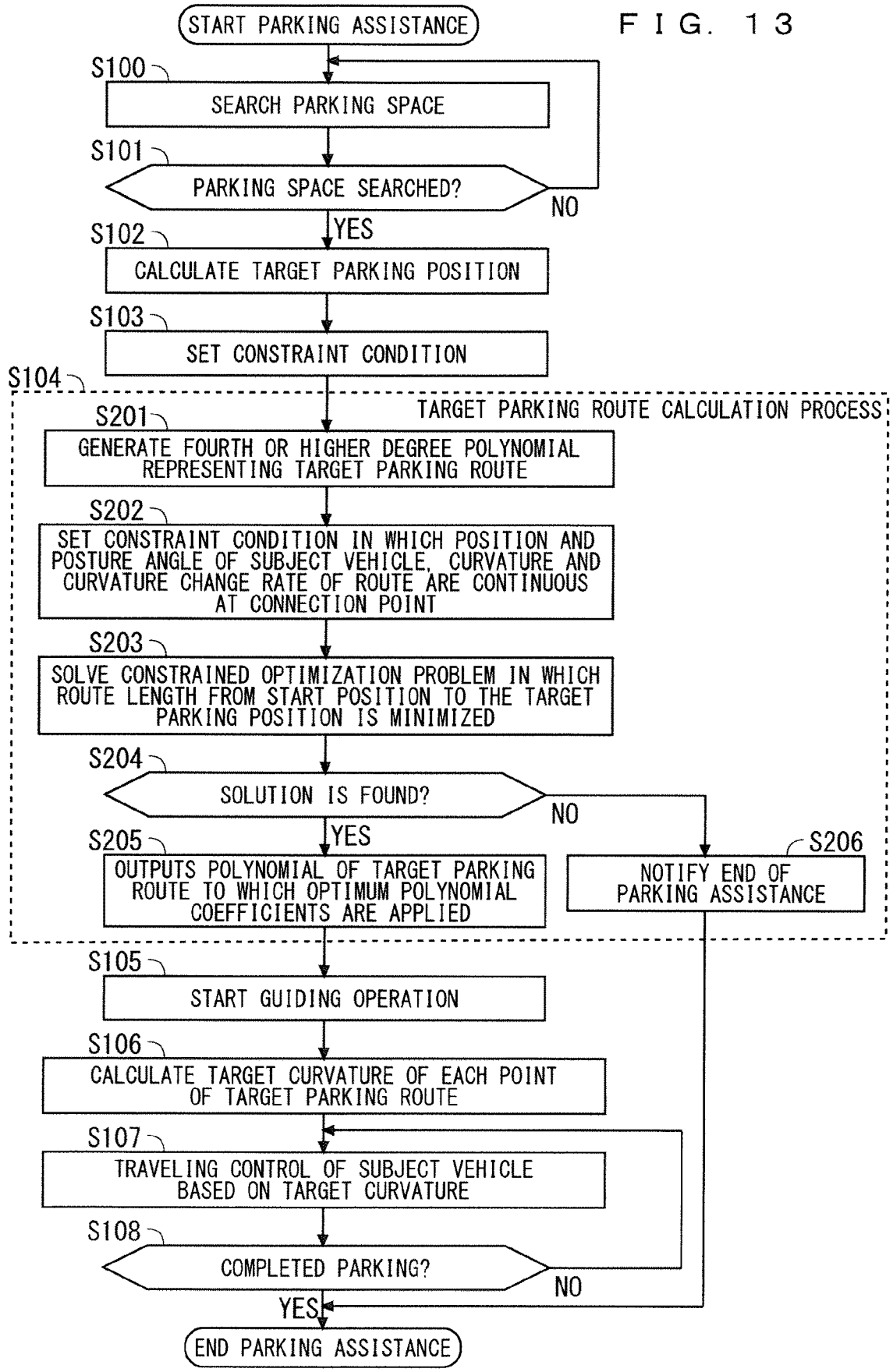
FIG. 13 A flowchart illustrating details of the operation of the parking assistance device according Embodiment of the present invention.

Here, the target parking route calculation process performed in Step S104 of FIG. 12 will be described referring to the flowchart of FIG. 13. The flowchart of FIG. 13 illustrates details of the portion of Step S104 of the flowchart of FIG. 12.

When entering the target parking route calculation process, the route polynomial generation unit 61 first divides the target parking route from the vehicle position to the target parking position into a plurality of sections, and generates a fourth or higher degree polynomial representing each of the plurality of sections (Step S201).

Next, the constraint condition setting unit 5 generates the constraint condition in which the position and the posture angle of the subject vehicle, the curvature and the curvature change rate of the target parking route are continuous at the connection point of each section of the target parking route, and adds the constraint condition to the constraint conditions set in Step S103 (Step S202). Then, the optimum route determination unit 62 solves the constrained optimization problem in which the route length from the start position to the target parking position is minimized under the constraint conditions (Step S203). Then, when a solution to the optimization problem is found (YES in Step S204), the optimum route determination unit 62 outputs the polynomial of the target parking route to which the optimum polynomial coefficients are applied as the definitive target parking route (Step S205).

Meanwhile, when there is no solution to the optimization problem (NO in Step S204), the optimum route determination unit 62 notifies the vehicle control unit 7 of ending of the parking assistance (Step S206), and the parking assistance operation ends.

Figure 14:
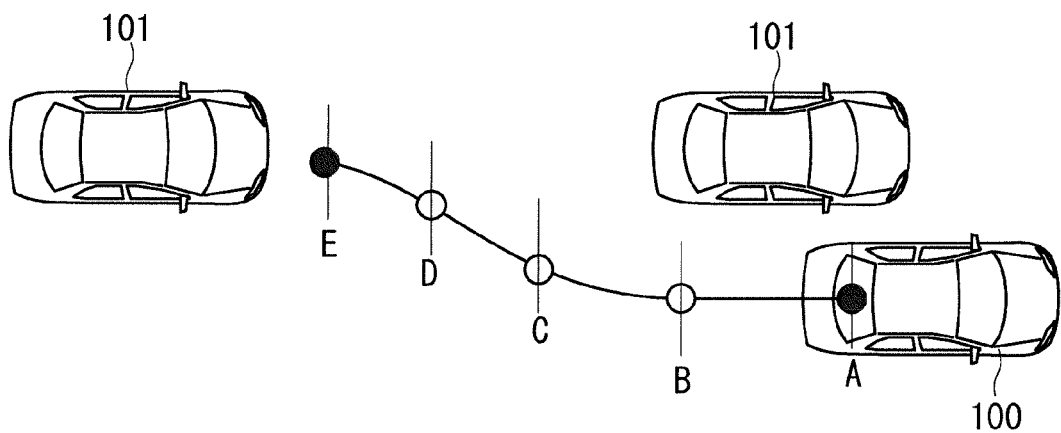
FIG. 14 A diagram illustrating an example of a target parking route calculated by the parking assistance device according to Embodiment of the preset invention.
Figure 15:
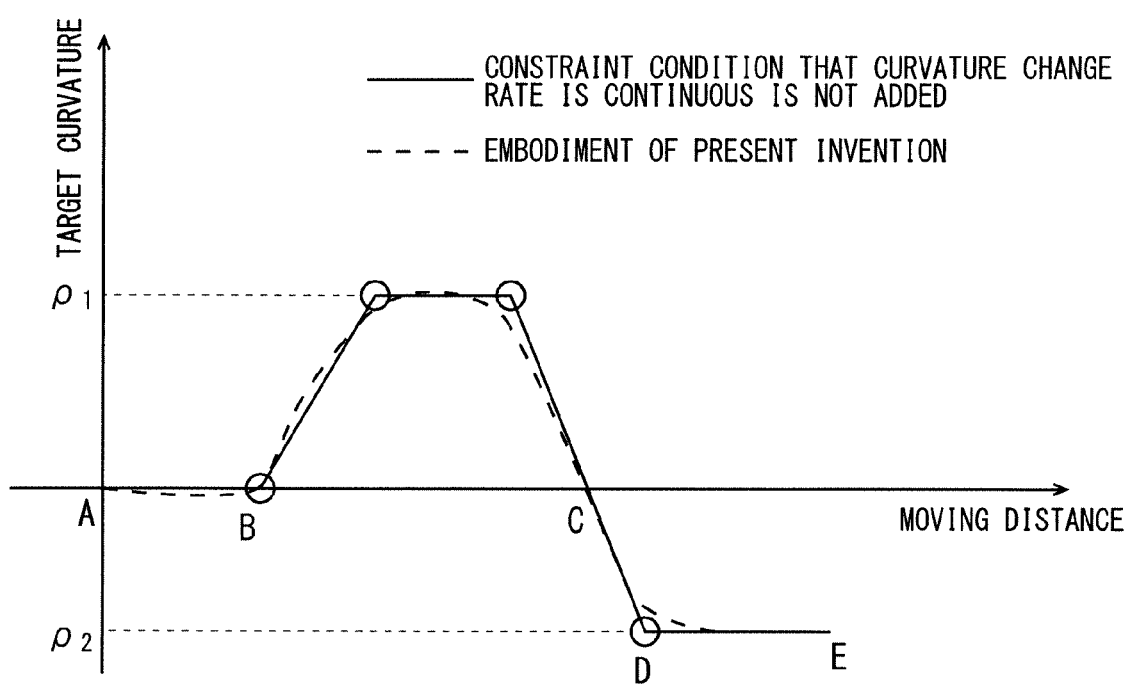
FIG. 15 A diagram illustrating an example of a map of target curvature in a target parking route calculated by the parking assistance device according to Embodiment of the present invention.

As described above, the parking assistance device 10 according to Embodiment can calculate the target parking route satisfying the constraint conditions that the curvature change rate is continuous. For example, as illustrated in FIG. 14, when the parking assistance device 10 according Embodiment calculates the target parking route when parallel parking the subject vehicle 100 in the parking space between the pre-existing parked vehicles 101 and 102 lined up in front and behind, the map of the target curvature corresponding to the target parking route has a smooth waveform as illustrated by the broken line in FIG. 15 (the solid line in FIG. 15 is a map when the constraint condition that the curvature change rate is continuous is not added). Therefore, according to the parking assistance device 10 according to Embodiment, a parking route that enables a vehicle to park at a parking position without having a large change in the steering wheel behavior.

Figure 16:
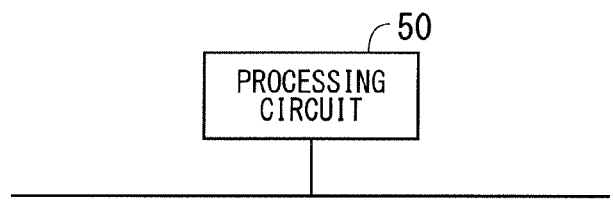
FIG. 16 A diagram illustrating an example of a hardware configuration the parking assistance device.
Figure 17:
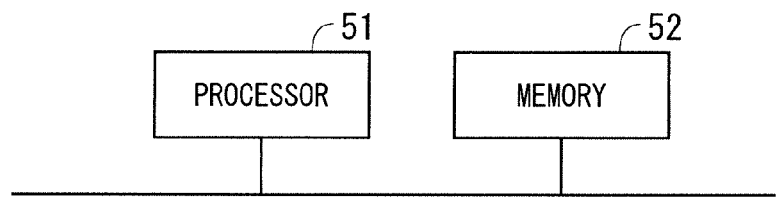
FIG. 17 A diagram illustrating an example of a hardware configuration the parking assistance device.

FIG. 16 and FIG. 17 are diagrams each illustrating an example of a hardware configuration the parking assistance device 10. Each function of the component of the parking assistance device 10 illustrated in FIG. 1 is realized by, for example, a processing circuit 50 illustrated in FIG. 16. That is, the parking assistance device 10 includes the processing circuit 50 configured to calculate a position and a posture angle of the subject vehicle, acquire peripheral information of the subject vehicle, detect a parking space based on the peripheral information of the subject vehicle, calculate a target parking position of the vehicle based on positions of corner points of the parking space, set constraint conditions (including the condition that the curvature change rate of the target parking route is continuous) regarding a target parking route for guiding the subject vehicle to the target parking position, based on the position and the posture angle of the subject vehicle, the peripheral information, and the positions of corner points of the parking space, calculate the target parking route based on the position and the posture angle of the subject vehicle, the positions of the corner points of the parking space, the target parking position, and the constraint conditions, and park the subject vehicle at the target parking position by making the subject vehicle travel following the target parking route. Dedicated hardware may be adopted for the processing circuit 50, or the processing circuit 50 may also be configured with a processor (also referred to as Central Processing Unit (CPU), processing unit, arithmetic unit, microprocessor, microcomputer, Digital Signal Processor (DSP)) that executes a program stored in a memory may also be adopted.

When the dedicated hardware is adopted for the processing circuit 50, the processing circuit 50 corresponds to a single circuit, a composite circuit, a programmed processor, a parallel programmed processor, an Application Specific Integrated Circuit (ASIC), or a Field-Programmable Gate Array (FPGA), or the combination thereof. Each function of the components of the parking assistance device 10 may be realized by an individual processing circuit, or the functions may be collectively realized by one processing circuit.

FIG. 17 illustrates an example of the hardware configuration of the parking assistance device 10 when the processing circuit 50 is configured by using a processor 51 that executes the program. The functions of the parking assistance device 10 are realized by software (software, firmware, or a combination of software and firmware) or the like. The software or the like is described as a program and stored in a memory 52. The processor 51 realizes the functions of each part by reading and executing the program stored in the memory 52. That is, the parking assistance device 10 includes the memory 52 for storing the program which, eventually, executes a process to calculate a position and a posture angle of the subject vehicle, a process to acquire peripheral information of the subject vehicle, a process to detect a parking space based on the peripheral information of the subject vehicle, a process to calculate a target parking position of the vehicle based on positions of corner points of the parking space, a process to set constraint conditions (including the condition that the curvature change rate of the target parking route is continuous) regarding a target parking route for guiding the subject vehicle to the target parking position, based on the position and the posture angle of the subject vehicle, the peripheral information, and the positions of corner points of the parking space, a process to calculate the target parking route based on the position and the posture angle of the subject vehicle, the positions of the corner points of the parking space, the target parking position, and the constraint conditions, and a process to park the subject vehicle at the target parking position by making the subject vehicle travel following the target parking route. when executed by the processor 51. In other words, it can be said that the program causes a computer to execute the procedure and method of the parking assistance device 10.

Here, the memory 52 may be, for example, a non-volatile or volatile semiconductor memory, such as a Random Access Memory (RAM), a Read Only Memory (ROM), a flash memory, an erasable programmable read only memory (EPROM), an electrically erasable programmable read only memory (EEPROM), or the like, a hard disk drive (HDD), a magnetic disk, a flexible disk, an optical disk, a compact disk, a mini disk, a digital versatile disc (DVD) and a drive device therefor, or any storage medium used in the future.

The configuration has been described thus far, in which the function of each component of the parking assistance device 10 is realized by, one of hardware and software or the like. However, the present invention is not limited thereto, and a configuration in which part of the components of the parking assistance device 100 may be realized by dedicated hardware and another part of the components may be realized by software or the like. For example, for some parts, the functions are realized by the processing circuit 50 as dedicated hardware, an interface, and for other parts, the functions are realized by the processing circuit 50 as the processor 51 reading and executing the program stored in the memory 52.

As described above, the parking assistance device 10 can realize the functions described above by hardware, software, or the like, or a combination thereof.

It should be noted that Embodiment of the present invention can be arbitrarily combined and can be appropriately modified or omitted without departing from the scope of the invention.

While the invention has been described in detail, the forgoing description is in all aspects illustrative and not restrictive. It is understood that numerous other modifications can be devised without departing from the scope of the invention.

EXPLANATION OF REFERENCE SIGNS 10 parking assistance device, 1 vehicle position information calculation unit, 2 peripheral information acquisition unit, 3 parking space detection unit, 4 target parking position calculation unit, 5 constraint condition setting unit, 6 target parking route calculation unit, 7 vehicle control unit, 61 route polynomial generation unit, 62 optimum route determination unit, 63 target curvature calculation unit, 50 processing circuit, 51 processor, 52 memory, 100 subject vehicle, 100s ultrasonic sensor, 101 pre-existing parked vehicle, 102 pre-existing parked vehicle, 111 wall, 112 curb, CN1, CN2 corner point of pre-existing parked vehicle.

The invention claimed is:
1. A parking assistance device comprising:
a processor to execute a program; and
a memory to store the program which, when executed by the processor, performs processes of:
calculating a position and a posture angle of a vehicle;
acquiring peripheral information of the vehicle;
detecting a parking space based on the peripheral information of the vehicle;
calculating a target parking position of the vehicle based on a position of a corner point of the parking space;
setting a constraint condition regarding a target parking route for guiding the vehicle to the target parking position based on a position and a posture angle of the vehicle, the peripheral information, and the position of the corner point of the parking space;
calculating the target parking route based on the position and the posture angle of the vehicle, the position of the corner point of the parking space, the target parking position, and the constraint condition; and
parking the vehicle at the target parking position by making the vehicle travel following the target parking route, wherein
the processor sets a condition that a curvature change rate of the target parking route is continuous as the constraint condition.

2. The parking assistance device according to claim 1, wherein
the processor divides a route from the position of the vehicle to the target parking position into a plurality of sections based on the position and posture angle of the vehicle, the position of the corner point of the parking space, and the target parking position, and represents each of the plurality of sections as a fourth or higher degree polynomial,
the processor determines a polynomial of each section of the target parking route by finding a solution in which the polynomial representing the plurality of sections satisfies the constraint condition, and the processor calculates a curvature of each point on the target parking route based on the polynomial of each section of the target parking route.

3. The parking assistance device according to claim 2, wherein
the processor determines the polynomial of each section of the target parking route by finding a solution in which the polynomial representing the plurality of sections satisfies the constraint condition, and the target parking route is as short as possible.

4. The parking assistance device according to claim 3, wherein
the processor further sets a movable range of the vehicle as the constraint condition.

5. The parking assistance device according to claim 4, wherein
the processor further sets an upper limit value of the curvature or the curvature change rate of the target parking route as the constraint condition.

6. The parking assistance device according to claim 3, wherein
the processor further sets an upper limit value of the curvature or the curvature change rate of the target parking route as the constraint condition.

7. The parking assistance device according to claim 2, wherein
when the processor does not find a solution in which the polynomial representing the plurality of sections satisfies the constraint condition, parking assistance of the vehicle ends.

8. The parking assistance device according to claim 7, wherein
the processor further sets a movable range of the vehicle as the constraint condition.

9. The parking assistance device according to claim 8, wherein
the processor further sets an upper limit value of the curvature or the curvature change rate of the target parking route as the constraint condition.

10. The parking assistance device according to claim 7, wherein
the processor further sets an upper limit value of the curvature or the curvature change rate of the target parking route as the constraint condition.

11. The parking assistance device according to claim 2, wherein
the processor further sets a movable range of the vehicle as the constraint condition.

12. The parking assistance device according to claim 11, wherein
the processor further sets an upper limit value of the curvature or the curvature change rate of the target parking route as the constraint condition.

13. The parking assistance device according to claim 2, wherein
the processor further sets an upper limit value of the curvature or the curvature change rate of the target parking route as the constraint condition.

14. The parking assistance device according to claim 1, wherein
the processor further sets a movable range of the vehicle as the constraint condition.

15. The parking assistance device according to claim 14, wherein
the processor further sets an upper limit value of the curvature or the curvature change rate of the target parking route as the constraint condition.

16. The parking assistance device according to claim 1, wherein
the processor further sets an upper limit value of the curvature or the curvature change rate of the target parking route as the constraint condition.

17. A parking assistance method comprising:
calculating a position and a posture angle of a vehicle;
acquiring peripheral information of the vehicle;
detecting a parking space based on the peripheral information of the vehicle;
calculating a target parking position of the vehicle based on a position of a corner point of the parking space;
setting a constraint condition regarding a target parking route for guiding the vehicle to the target parking position based on a position and a posture angle of the vehicle, the peripheral information, and the position of the corner point of the parking space;
calculating the target parking route based on the position and the posture angle of the vehicle, the position of the corner point of the parking space, the target parking position, and the constraint condition; and
parking the vehicle at the target parking position by making the vehicle travel following the target parking route, wherein
a condition that a curvature change rate of the target parking route is continuous as the constraint condition is set.

* * * * *